United States Patent
Wirola et al.

(10) Patent No.: US 11,592,517 B2
(45) Date of Patent: Feb. 28, 2023

(54) OFFLINE RADIO MAPS FOR GNSS-DENIED AREAS

(71) Applicant: HERE GLOBAL B.V., Eindhoven (NL)

(72) Inventors: Lauri Aarne Johannes Wirola, Tampere (FI); Petri Rauhala, Tampere (FI); Marko Luomi, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 128 days.

(21) Appl. No.: 17/128,037

(22) Filed: Dec. 19, 2020

(65) Prior Publication Data

US 2022/0196784 A1 Jun. 23, 2022

(51) Int. Cl.
*G01S 3/02* (2006.01)
*G01S 5/02* (2010.01)

(52) U.S. Cl.
CPC ...... *G01S 5/02523* (2020.05); *G01S 5/02521* (2020.05); *G01S 5/02524* (2020.05); *G01S 5/0252* (2013.01); *G01S 5/02522* (2020.05); *G01S 5/02526* (2020.05); *G01S 5/02527* (2020.05)

(58) Field of Classification Search
CPC ............... G01S 5/02523; G01S 5/0252; G01S 5/02521; G01S 5/02522; G01S 5/02524; G01S 5/02527
USPC ........................................................ 342/451
See application file for complete search history.

(56) References Cited

U.S. PATENT DOCUMENTS

| | | | |
|---|---|---|---|
| 8,588,097 B1 * | 11/2013 | Ogale | G01S 5/0252 370/252 |
| 9,179,265 B2 | 11/2015 | Marti et al. | |
| 9,335,175 B2 * | 5/2016 | Zhang | H04W 4/027 |
| 9,611,057 B2 | 4/2017 | Driscoll et al. | |
| 9,715,002 B2 * | 7/2017 | Wirola | G01S 5/0252 |
| 9,824,481 B2 | 11/2017 | Naguib et al. | |
| 9,939,515 B2 * | 4/2018 | Wirola | G01S 5/0252 |

(Continued)

FOREIGN PATENT DOCUMENTS

WO WO-2017042672 A1 * 3/2017 ............. G01C 15/00

OTHER PUBLICATIONS

Article—"Advanced Positioning by HERE," dated Apr. 14, 2020, https://developer.here.com/documentation/android-premium/3.15/dev_guide/topics/advanced-positioning (29 pps.).

*Primary Examiner* — Chuong P Nguyen
(74) *Attorney, Agent, or Firm* — Jeffrey R. Moisan; Here Global B.V.

(57) ABSTRACT

Disclosed is an approach to enable radio map download for Global Navigation Satellite System (GNSS)-denied areas. In particular, processor(s) (e.g., of positioning server(s)) could identify GNSS-denied area(s) in an initial radio map, the GNSS-denied area(s) being (i) one or more areas in which at least one GNSS signal is or was unavailable and (ii) a subset of a plurality of areas represented by the initial radio map. Subsequently, the processor(s) could generate a partial radio map representing radio data only for the GNSS-denied area(s) identified in the initial radio map, and could then transmit the partial radio map to a mobile device for storage at the mobile device. In this way, the mobile device could optimize resource usage and perform radio-based position estimations at least in the GNSS-denied area(s) that were identified.

18 Claims, 8 Drawing Sheets

(56) References Cited

U.S. PATENT DOCUMENTS

| | | | |
|---|---|---|---|
| 10,098,087 B2 | 10/2018 | Rao et al. | |
| 10,267,894 B2 * | 4/2019 | Wirola | H04W 24/10 |
| 10,545,218 B2 | 1/2020 | Syrjarinne et al. | |
| 10,845,456 B2 * | 11/2020 | Ivanov | G06F 3/04847 |
| 10,972,873 B2 * | 4/2021 | Wirola | G10L 15/22 |
| 11,054,497 B2 * | 7/2021 | Wirola | G01S 5/0236 |
| 11,096,008 B1 * | 8/2021 | Batten | G01S 5/02523 |
| 11,134,461 B2 * | 9/2021 | Vyunova | G01S 5/012 |
| 2016/0025497 A1 | 1/2016 | Baalu et al. | |

* cited by examiner

OFFLINE RADIO MAPS FOR GNSS-DENIED AREAS

FIELD OF THE DISCLOSURE

Embodiments of the present disclosure relate to the field of positioning technologies, and more specifically to methods and systems for generation, download, and/or use of an offline (partial) radio map for positioning purposes.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure in buildings and on existing capabilities in consumer devices, such as on radio (e.g., Wi-Fi and/or Bluetooth) technologies that are already supported in numerous consumer devices on the market.

One approach for such radio-based positioning could involve crowdsourced collection of radio data from mobile devices, which may then be used for generating or updating radio map(s). This radio data may represent measurements of radio signals respectively observed by the mobile devices, which may include received signal strength value(s) and/or respective identifiers of radio node(s) emitting those signal(s), among other options. And once a radio map is generated or updated based on this data, the radio map may effectively model a radio environment in an indoor and/or outdoor area, and could enable an entity (e.g., a server or a mobile device) to determine characteristics of radio signals that are expected to be observable respectively at different locations in the area. Given this, the entity could compare further (e.g., radio) measurements from a mobile device to the radio map, to estimate a position of the mobile device in the area.

In this regard, radio-based positioning can be facilitated in accordance with various modes of operation, such as an online mode and an offline mode.

In the online mode, a mobile device could perform radio measurements and then provide radio data to a positioning server in accordance with these measurements. The positioning server could have a radio map (e.g., a global radio map) stored thereon or otherwise accessible, and the positioning server could then use the received radio data and the radio map to determine and provide a position estimate to the mobile device. In this way, the mobile device could obtain a position estimate e.g., via a positioning application programming interface (API) without the need to store a radio map, as long as the mobile device has data connectivity.

In the offline mode, however, a mobile device may store a local copy of a partial radio map (e.g., a subset of the global radio map), which could also be referred to as an offline radio map, downloaded or downloadable radio map, or the like. The mobile device could download this local copy from the positioning server, or the local copy could be installed or loaded onto the device in any feasible manner. In either case, the mobile device could perform radio measurements in an area and then use those measurements in combination with the partial radio map for the area so as to estimate the position of the mobile device in that area.

Overall, the offline mode of radio-based positioning may have various advantages, including for the mobile device or its user as well as for the provider of the positioning service. For example, in the offline mode, a mobile device can effectively position itself in a given area even without data connectivity as long as the mobile device has a local copy of a partial radio map for that given area, thereby increasing "location awareness" of the mobile device whether or not data connectivity is possible or reliable. And because mobile devices can effectively position themselves in the offline mode without contacting a positioning server each time, the offline mode can also help reduce use of computational and energy resources by positioning server(s), even when online positioning is available. Moreover, because a mobile device does not need to contact a positioning server in the offline mode, there is no need for the mobile device to wait to receive a position estimate from the positioning server, which in turn reduces the time for obtaining a position estimate (i.e., a faster "time-to-first-fix"). Other examples are also possible.

Although the offline positioning mode has numerous benefits, this offline mode also has some drawbacks. For example, in a standard arrangement for downloading or otherwise obtaining a partial radio map for storage, a mobile device is typically configured to request tiles of the global radio map corresponding to e.g., a pre-defined (e.g., 1-kilometer) radius around the device's current location, thereby causing a positioning server to provide a partial radio map corresponding to an area associated with that pre-defined radius. Unfortunately, however, the data size of the partial radio map may end up being relatively large, which could lead to excessive consumption of computational and other resources.

One approach for addressing this data size issue could involve applying algorithms to exclude some radio nodes (i.e., represented in the global radio map) from being represented in the partial radio map, the excluded radio nodes being deemed as non-relevant for inclusion according to one or more factors and specifically being in areas of high radio node density in the global radio map. Yet, although this approach could help reduce the data size while enabling offline positioning in those areas, this approach still may not sufficiently reduce the data size of partial radio maps.

In particular, as communication networks keep expanding (e.g., due to 5G deployment or the like), the number of serving radio nodes grows rapidly, which may further increase the size of the global radio map over time. And as the size of the global radio map increases, the size of partial radio maps obtainable by mobile devices may also increase under the above-described standard arrangement. In turn, this may increase consumption of valuable communication bandwidth, energy resources at the device and/or server, and/or the device's storage space etc.

Therefore, at issue then is how to further reduce the respective sizes of partial (offline) radio maps while ensuring that mobile devices can still benefit from the offline mode as described and use it to obtain reliable position estimations, and so on. Accordingly, a technical improvement is desired and would advantageously improve performance of radio-based positioning systems.

SUMMARY

Disclosed herein is an improved approach for reducing respective size(s) of partial radio map(s) that can be used by mobile device(s) for purposes of offline radio-based positioning.

The disclosed approach stems from a recognition that existing approaches do not account for situation(s) where a mobile device could determine its position in certain area(s) without an offline radio map for those area(s), whether or not online positioning is also available.

For example, assuming that the mobile device has communication radio(s) and a Global Navigation Satellite System (GNSS) receiver, the mobile device can likely determine its position using GNSS in "open sky" conditions and might need offline radio map(s) only for area(s) where GNSS is unavailable so as to determine its position "offline" in those area(s). Such area(s) where GNSS is temporarily or permanently unavailable could be referred to as GNSS-denied areas and could include e.g., indoor area(s), urban canyon(s), area(s) where flawed (e.g., distorted) or no GNSS signal(s) arrive due to technical satellite issues, and/or area(s) where GNSS "spoofing" or "jamming" device(s) disturb GNSS signal(s), among other possibilities.

Given this, if a mobile device obtains an offline radio map according to the above-described standard arrangement, that offline radio map may unnecessarily include radio data for area(s) in which GNSS positioning works for the mobile device as well. And including radio data for such area(s) in the offline radio map may needlessly increase the size of the offline radio map, which could ultimately still lead to excessive consumption of valuable bandwidth, energy, storage space, and/or other resources as described.

To help overcome this issue, the disclosed approach may provide for better control as to which area(s) to represent in an offline radio map that can be generated from an initial (e.g., global) radio map stored at or otherwise accessible to positioning server(s) or the like.

Specifically, the disclosed approach may involve positioning server(s) generating and providing a partial radio map only for GNSS-denied area(s), which may be area(s) where GNSS signal(s) are or were unavailable to mobile device(s) as noted. Such GNSS-denied area(s) can be identified or otherwise deduced using one or more techniques further described herein. And once the GNSS-denied area(s) are identified, positioning server(s) could generate a partial radio map representing radio data only for the identified GNSS-denied area(s), and could transmit the partial radio map to a mobile device for storage at the mobile device. Once the mobile device receives the partial radio map, the mobile device could then use that partial radio map for "offline" radio-based position estimate(s) in one or more of the GNSS-denied areas, as necessary.

In this way, the disclosed approach may help reduce the size of offline radio map(s) obtained by mobile device(s) while ensuring that those offline radio map(s) still have sufficient data to enable offline positioning in area(s) where such offline positioning capabilities would be beneficial, such as in GNSS-denied area(s). And by helping to reduce the size of offline radio map(s), the disclosed approach can in turn provide a technical solution to help eliminate or reduce excessive consumption of network, energy, storage, and/or other resources. Other advantages are possible as well without departing from the scope of the present disclosure.

Accordingly, in one aspect, disclosed is a first method. The first method involves: identifying, by one or more processors, one or more Global Navigation Satellite System (GNSS)—denied areas in an initial radio map, where the initial radio map represents radio data respectively for a plurality of areas, and where the one or more GNSS-denied areas are (i) one or more areas in which at least one GNSS signal is or was unavailable and (ii) a subset of the plurality of areas represented by the initial radio map; generating, by the one or more processors, a partial radio map representing radio data only for the one or more GNSS-denied areas identified in the initial radio map; and transmitting, by the one or more processors, the partial radio map to a mobile device for storage at the mobile device.

In another aspect, disclosed is a second method. The second method involves: receiving, by a mobile device from a positioning server, a partial radio map representing radio data only for one or more GNSS-denied areas identified in an initial radio map, where the initial radio map represents radio data respectively for a plurality of areas, and where the one or more GNSS-denied areas are (i) one or more areas in which at least one GNSS signal is or was unavailable and (ii) a subset of the plurality of areas represented by the initial radio map; storing, by the mobile device, the partial radio map in a local data storage device; and performing, by the mobile device, one or more radio-based position estimations based on the partial radio map representing radio data only for the one or more GNSS-denied areas.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed first and/or second methods, among others.

In yet another aspect, disclosed is a non-transitory computer readable medium having stored thereon instructions executable by one or more processors to cause a device or system to perform operations described herein, such as any of those set forth in the disclosed first and/or second methods, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
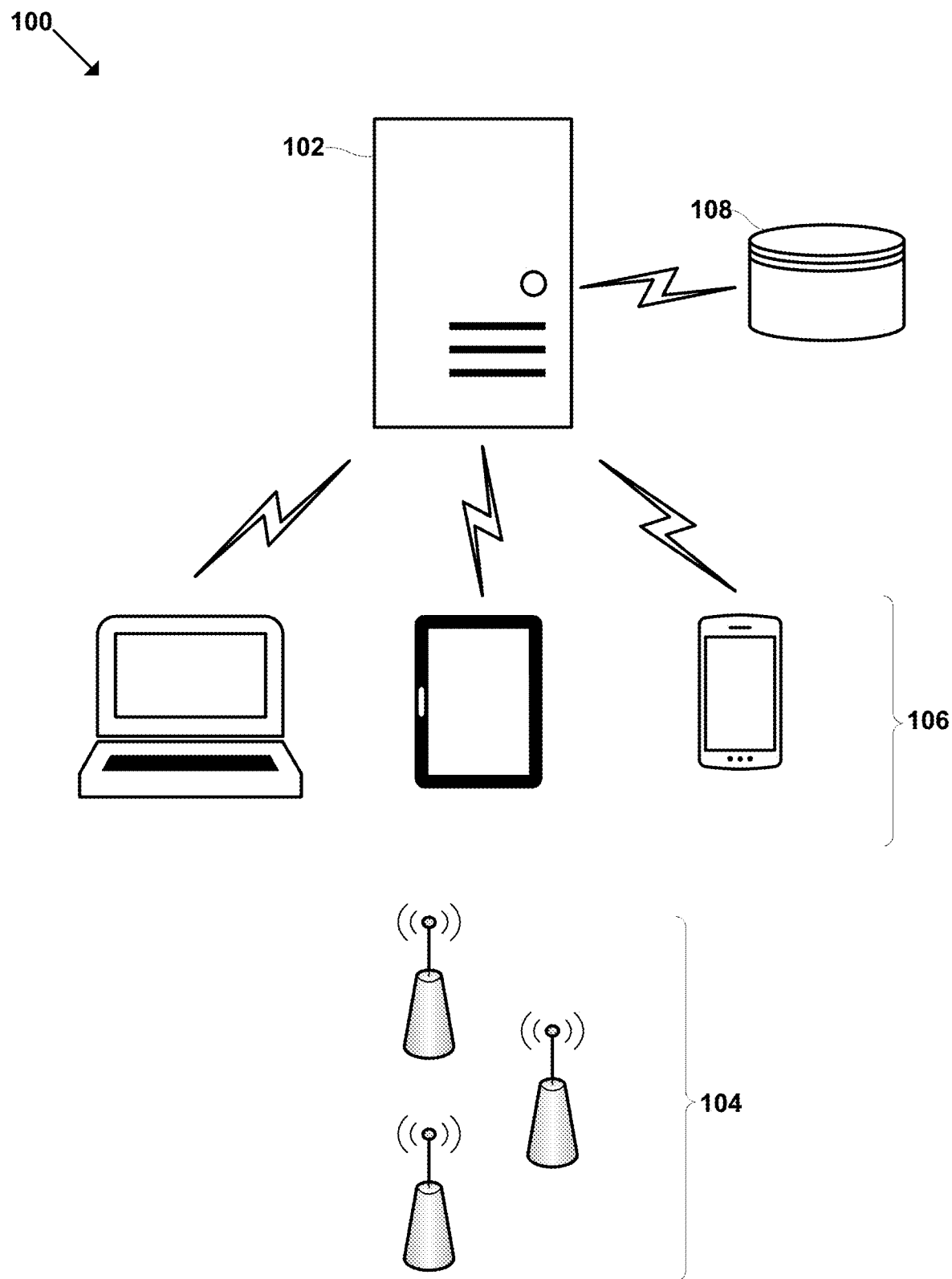
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example Positioning Systems

Positioning methods that are seamless and available at all times might rely upon novel systems and solutions that are specifically developed and, if necessary, deployed for this purpose. Traditional positioning technologies, which are mainly used outdoors (e.g., satellite and cellular positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g. satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on technologies like Wi-Fi and/or Bluetooth, which are already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent a position estimate (e.g., also known as a reference location/position) and measurement(s) by the mobile device. The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may defined the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally (e.g., a partial radio map that included a subset of tiles from a global radio map representing radio data for a plurality of areas (e.g., throughout the world, countries, and/or states)). Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
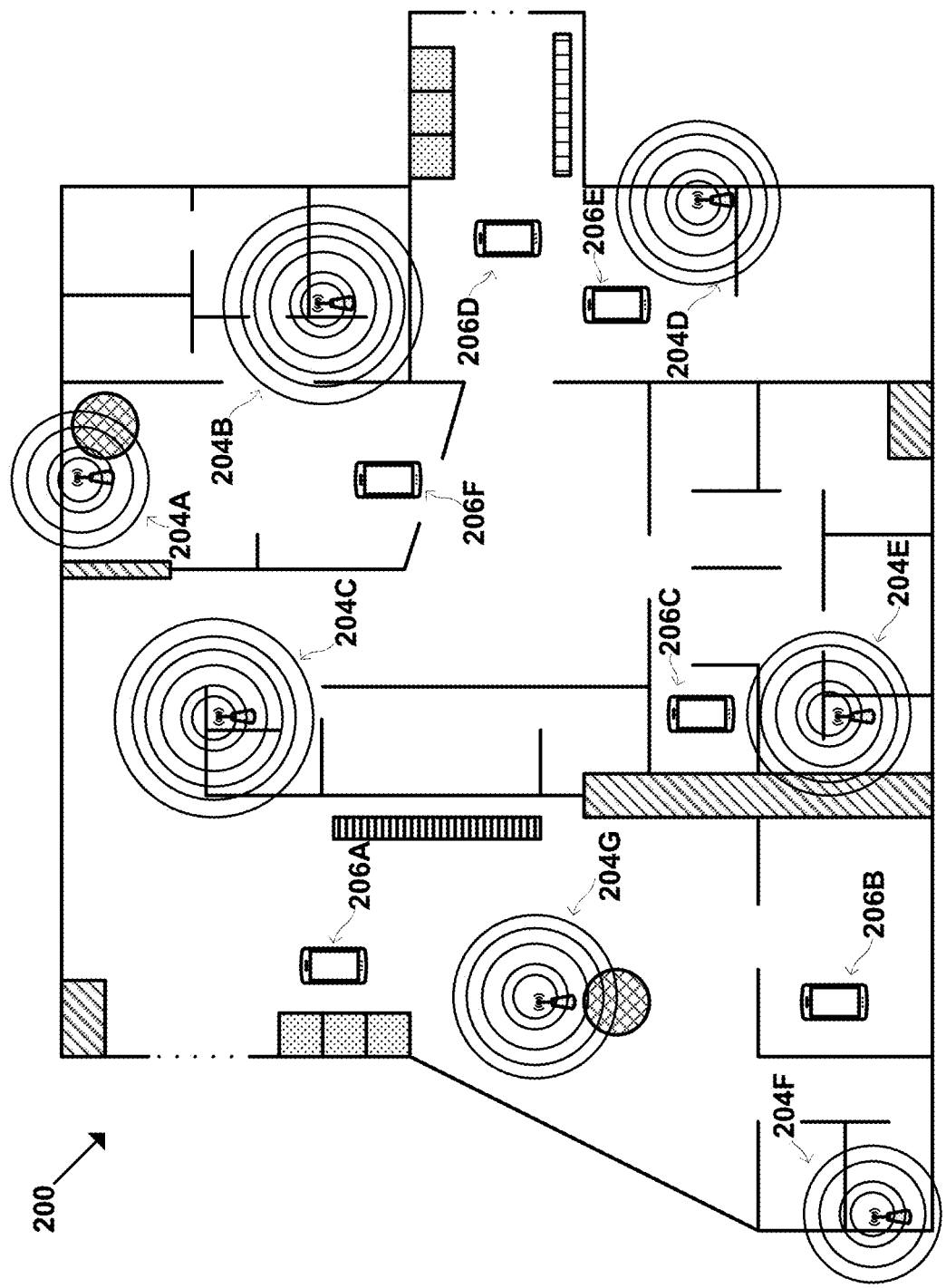
FIGS. 2A and 2B illustrate an indoor area at which radio device(s) and mobile device(s) can be located, in accordance with an example implementation.
Figure 2B:
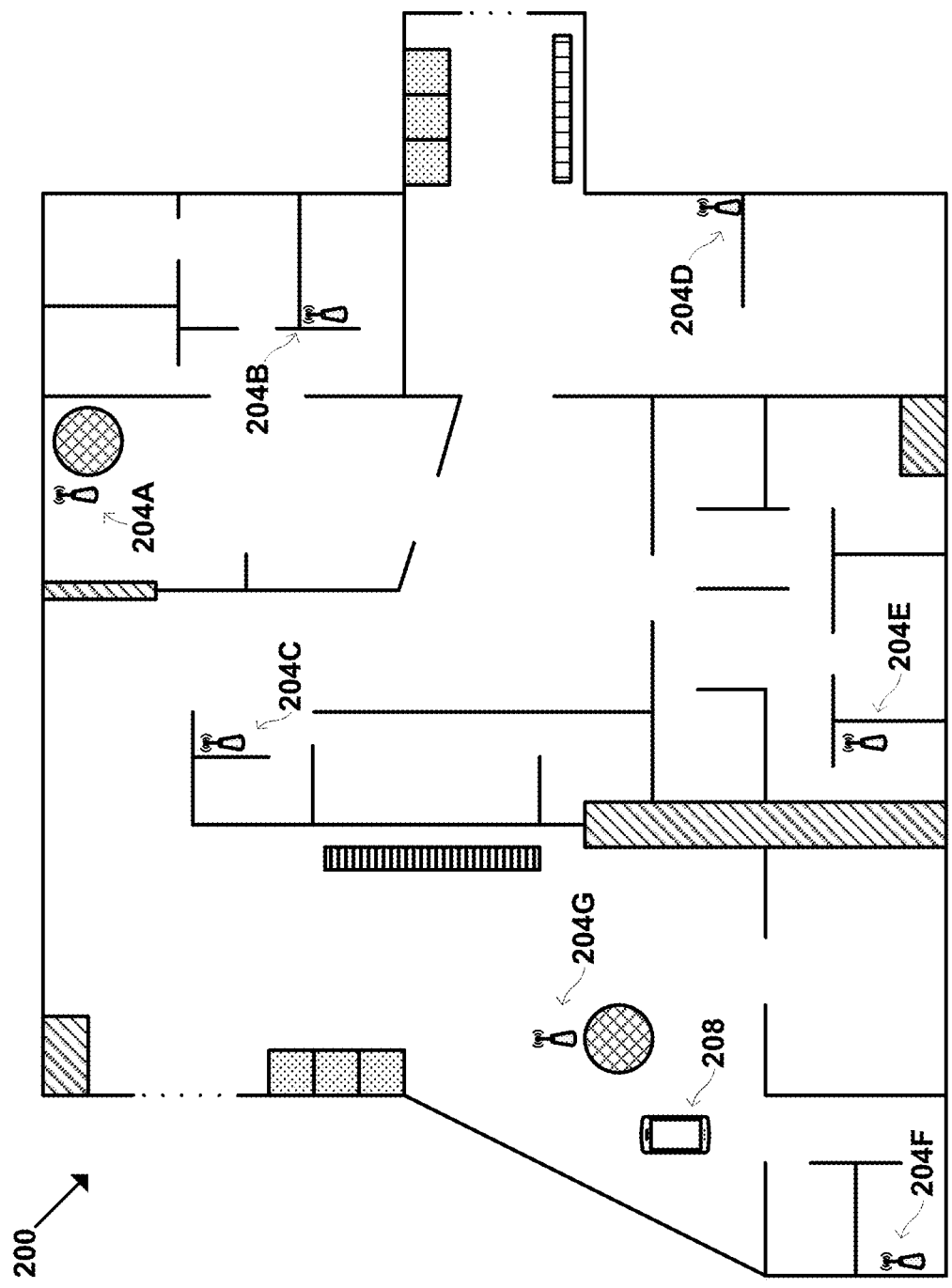
Figure 2C:
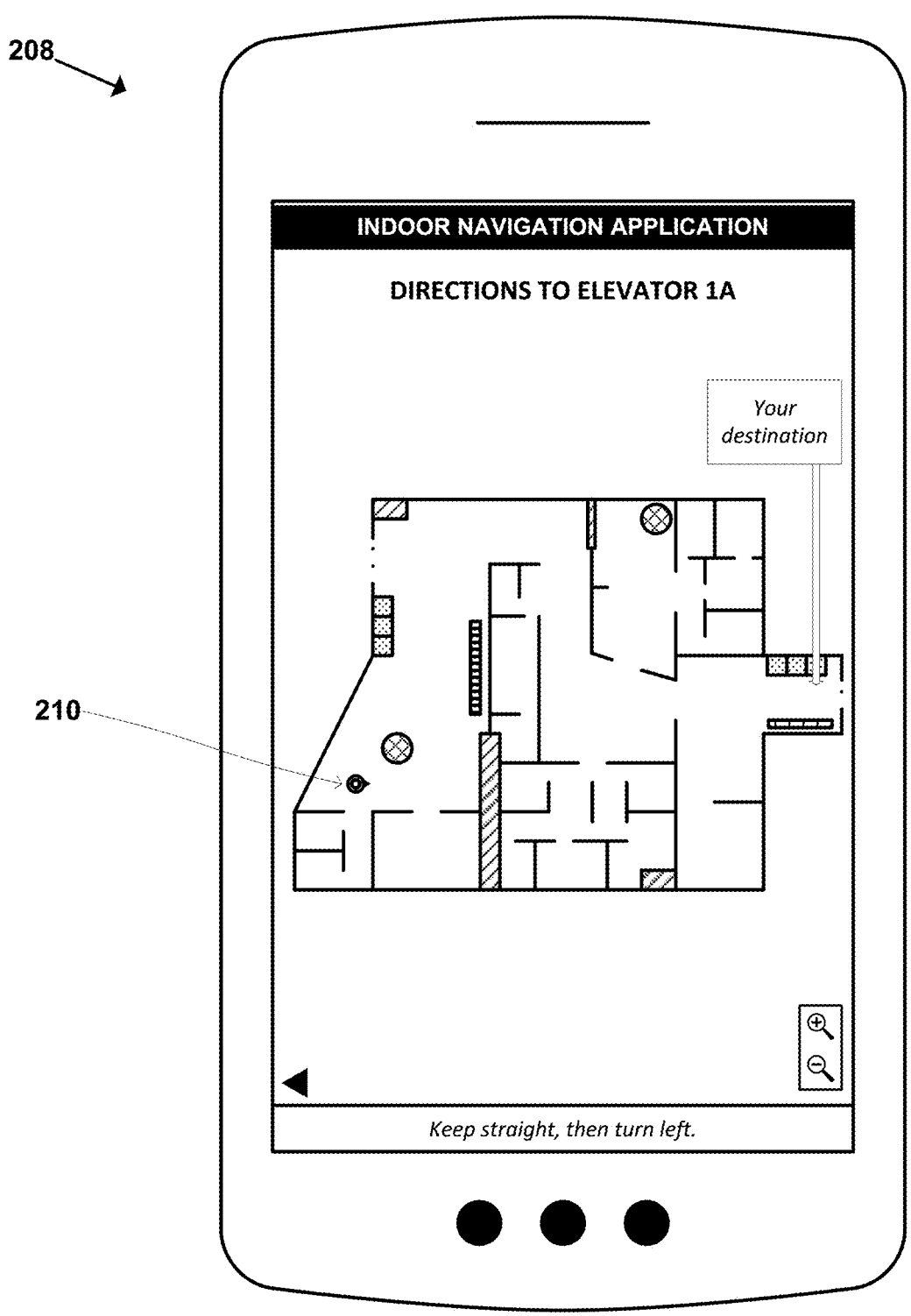
FIG. 2C illustrates an example indoor navigation application, in accordance with an example implementation.

FIGS. 2A to 2C next illustrate an example implementation and use of the above-described positioning solution.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Illustrative Methods

As noted above, the present disclosure is directed to an improved approach for reducing respective size(s) of partial radio map(s) that can be used by mobile device(s) for purposes of offline radio-based positioning. Advantageously, this improved approach can help eliminate or reduce excessive consumption of network, energy, storage, and/or other resources that may otherwise occur due to use of offline radio maps that are unnecessarily too large in data size.

Figure 3:
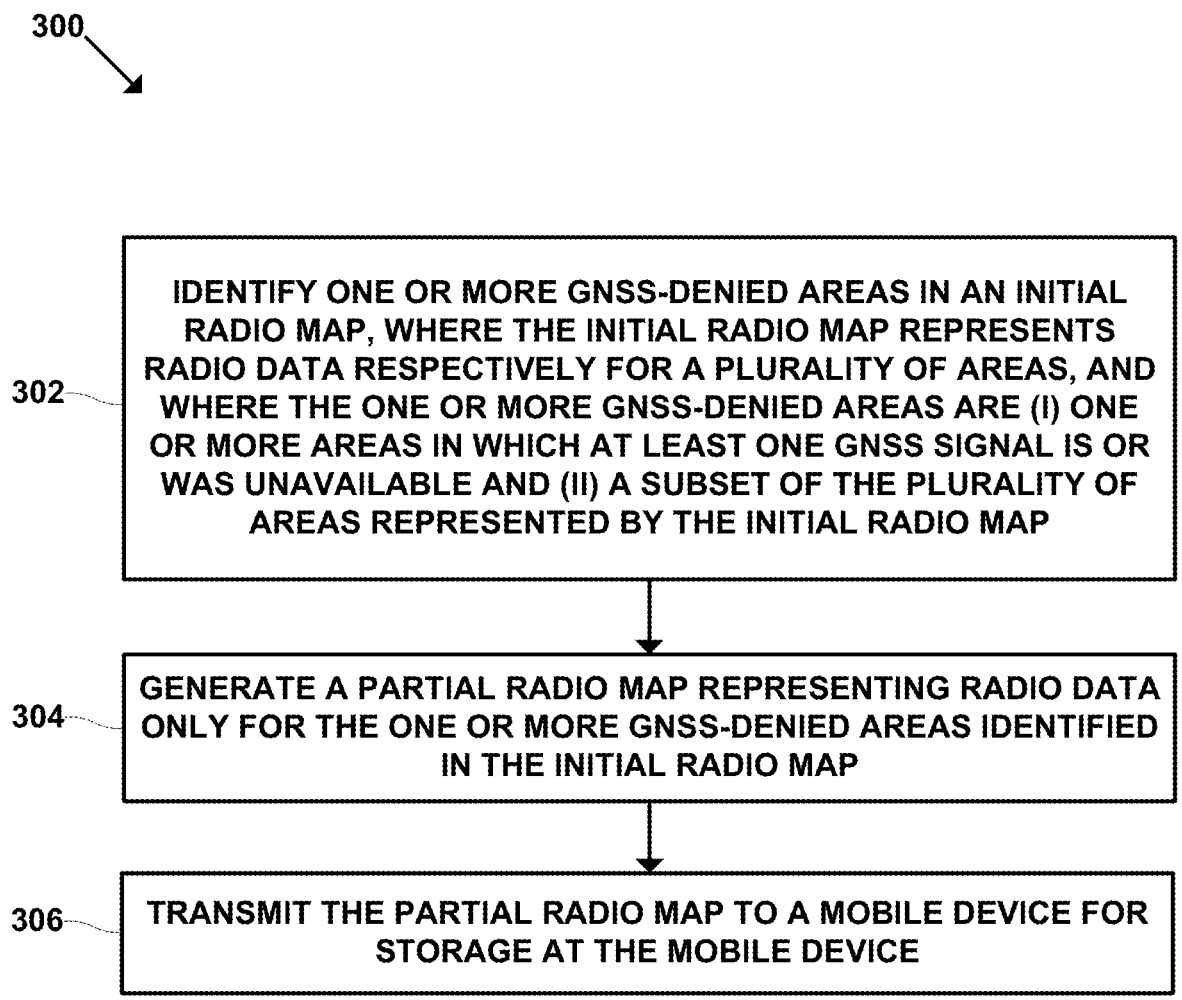
FIG. 3 is an example flowchart related to generating and transmitting a partial radio map associated with GNSS-denied areas, in accordance with an example implementation.

FIG. 3 is next a flowchart illustrating method 300, in accordance with the present disclosure. Method 300 could be performed by and/or in an arrangement involving a server device, and/or any other device or system. Also, it should be understood that, if a method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results etc. Moreover, in some implementations, the various operations described herein could be distributed among one or more entities, such as in accordance with a client-server arrangement or the like. Other arrangements are also possible.

In an example implementation, method 300 could be performed by and/or in an arrangement involving a positioning system (e.g., server(s) 102) or more particularly by component(s)/module(s) (e.g., processor(s)) thereof, among other possibilities. For sake of simplicity, method 300 is described herein as being performed by a positioning server.

At block 302, method 300 may involve identifying GNSS-denied area(s) in an initial radio map, where the initial radio map represents radio data respectively for a plurality of areas, and where the GNSS-denied area(s) are (i) one or more areas in which at least one GNSS signal is or was unavailable and (ii) a subset of the plurality of areas represented by the initial radio map.

In accordance with an example implementation, the positioning server could store or otherwise have access to an initial radio map, which could represent radio data for a plurality of areas. In practice, this initial radio map could take on various forms and represents various types of areas without departing from the scope of the present disclosure. For instance, the initial radio map could be a global radio map representing radio data for a plurality of areas around the globe, such as for various countries, states, and/or cities etc. The global radio map could be generated based on crowdsourced data collected from various devices around the globe, among other options.

Additionally, the initial radio map could be configured in any feasible manner that can enable facilitating of the disclosed approach. For example, the initial radio map could be configured according to geographical indexing that is sufficiently granular to enable retrieval from a radio map database of radio data for relatively small geographical area(s). In practice, such granularity can be achieved by leveraging currently known and/or future-developed geospatial indexing mechanism(s) used in spatial databases to optimize spatial queries (e.g., "R-tree".)

Given this, the positioning server could identify GNSS-denied area(s), which are area(s) where at least one GNSS is or was unavailable for any reason contemplated herein and/or other reason. The positioning server could identify the GNSS-denied area(s) (and/or otherwise initiate the process of method 300) in a proactive and/or reactive manner.

For example, the positioning server could identify one or more GNSS-denied area(s) in response to a request from a mobile device. The request could be a positioning request or a download request to obtain an offline radio map for an area that encompasses these GNSS-denied area(s), among others. In this case, the positioning server could designate the identified area(s) as being "GNSS-denied", so that these area(s) can be quickly identified as being "GNSS-denied" in the future, such as when future request(s) are received from mobile device(s).

Additionally or alternatively, the positioning server could proactively identify one or more GNSS-denied area(s), and could do so continuously, from time-to-time, in accordance with a pre-defined schedule, and/or in response to any other feasible trigger with or without a request from a mobile device. In this way, the positioning server could proactively designate the identified area(s) as being "GNSS-denied", so that these area(s) can be quickly identified as being "GNSS-denied" once request(s) are received from mobile device(s).

In any case, the positioning server could designate identified area(s) as being GNSS-denied area(s) in various ways. For example, the positioning server could identify a portion of the global radio map in the radio map database that corresponds to a GNSS-denied area, and programmatically associate the identified portion with a value or the like indicating that the portion represents a GNSS-denied area, such as by storing the association at issue in the radio map database for future reference. In some implementations, this portion could be one or more radio map tiles and thus the server device could programmatically associate tile ID(s) for an identified area with value(s) indicating that that the identified area is a GNSS-denied area. In yet other implementations, the portion at issue could be a representation of geographic coordinate(s) and/or other geographical data point(s), among other options.

In some implementations, designation of an identified area as being a GNSS-denied area may be temporary. For example, the positioning server could designate an area as being GNSS-denied for a (e.g., pre-defined) duration of time, and may remove this designation after this duration expires. In another example, the positioning server could designate an area as being GNSS-denied and could remove this designation in response to receiving any information indicating that this area is no longer GNSS-denied. In practice, this information could be based on any technique(s) for identifying whether or not area(s) are GNSS-denied, as further described herein, among others. Other examples are also possible.

Further, in some implementations, the positioning server could identify GNSS-denied area(s) based on the GNSS-denied area(s) being within a pre-defined threshold distance away from the mobile device. For example, the positioning server could receive information indicating a (e.g., current) location of the mobile device, such as part of a radio map download request or another request from the mobile device. In practice, this could occur as part of the above-described standard arrangement for a mobile device to download or otherwise obtain an offline radio map for local storage, among other possibilities. In any case, the positioning server could be configured to identify GNSS-denied area(s) only within the pre-defined threshold distance (e.g., within a pre-defined (e.g., 1-killometer) radius around the device's current location), so as to ultimately provide, to the mobile device, a partial radio map representing radio data for the identified GNSS-denies area(s) and optionally also for other area(s), which may or may not be GNSS-denied but may still be within the pre-defined threshold distance. Other examples are also possible.

In a system arranged as described, the positioning server could programmatically apply certain technique(s) to identify GNSS-denied area(s) in an initial radio map. In practice, the positioning server could apply just one technique or any feasible combination of the technique(s) at issue. In some situations, the positioning server could apply different technique(s) respectively for evaluating whether different area(s) are GNSS-denied. In other situations, the positioning server could apply any feasible combination of techniques to evaluate whether a given area is GNSS-denied and could do so in any feasible manner. For instance, the positioning server could use one technique to determine whether the given area is GNSS-denied, and another technique to verify or otherwise confirm the determination at issue, among other options. Finally, although certain techniques are disclosed herein, it should be understood that other technique(s) may also be possible without departing from the scope of the present disclosure.

In a first example technique, the positioning server could identify a GNSS-denied area by searching the initial radio map for areas with radio data in multiple vertical layers or levels. In particular, a crowd-sourced positioning service could model a radio environment in three-dimensions (3D) to enable floor level positioning e.g., in multi-level buildings. For instance, such a positioning solution could store different radio data respectively for each floor or other vertical level (e.g., z-axis), even for the same horizonal position. So when such a multi-layer area is present in the initial radio map, presence of this multi-layer area could serve as an indication that a building is present in that area and thus that the area could be deemed to be a GNSS-denied area, because GNSS service is typically unavailable or unreliable within indoor spaces or the like.

Accordingly, the positioning server could identify, in the initial radio map, a multi-layer area that represents radio data in two or more vertical layers, and could then deem the identified multi-layer area as a GNSS-denied area that can be represented by a partial radio map.

For example, the positioning server could identify the multi-layer area by making a determination that, in the initial radio map, one or more horizontal positions within this area each respectively have associated radio data for two or more respective vertical layers, Namely, radio data may be associated with a horizontal position in one vertical position (e.g., a given floor in a building) other radio data may be associated with the same horizontal position but in another vertical position (e.g., a different floor in the building.) Thus, the positioning server could use this determination as basis for identifying the multi-layer area and in turn deeming it to be a GNSS-denied area for purposes of the disclosed approach.

In another example, the positioning server could identify the multi-layer area by evaluating an altitude map associated with the initial radio map. The altitude map may represent altitudes respectively at different locations that may also be represented by the initial radio map. Given this, the positioning server could make a determination that, in the altitude map, one or more horizontal locations within an area each respectively associated with multiple respective altitudes, which may be an indication of a multi-layer structure in the area and possibly that the initial radio map has radio data for multiple vertical layers of that area. Thus, the positioning server could use this determination as basis for identifying the area as a multi-layer area and in turn deeming it to be a GNSS-denied area for purposes of the disclosed approach. Other examples are also possible.

In a second example technique, the positioning server could identify a GNSS-denied area by searching the initial radio map for areas where associated radio fingerprint(s) do not have respective reference location(s) that are determined based on GNSS, but rather are based on non-GNSS reference location(s). In particular, as discussed herein, mobile device(s) could determine or otherwise obtain reference location(s) for fingerprint(s) in various ways, such as based on GNSS and/or based on other sources including but not limited to: sensor data (e.g., sensor-based extrapolation), previously collected radio measurements, and/or manual input via a user interface, among others. So, if a given fingerprint includes a non-GNSS reference location, this could serve as an indication that GNSS is or was not available at that given area for purposes of determiing a reference location for the given fingerprint. And the more such fingerprints (i.e., including a non-GNSS reference locations) are associated with that given area, the higher the likelihood of that area being GNSS-denied (e.g., a building, urban canyon, or the like), as contemplated herein.

Given this, the positioning server could evaluate crowd-sourced fingerprint(s) associated with a particular area in the radio map database, so as to determine whether this area is to be deemed a GNSS-denied area. To facilitate this, crowd-sourced fingerprint(s) could respectively include information about the respective source(s) of their respective reference location(s). In this way, the positioning server could identify, in the initial radio map, a particular area associated with radio fingerprint(s) that respectively include non-GNSS reference location(s), and could responsively deem the identified particular area as a GNSS-denied area. Moreover, in some implementations, the positioning server could be configured to deem a particular area as being a GNSS-denied area only if the positioning server determines that the number of non-GNSS fingerprints (i.e., fingerprints having non-GNS reference locations) is at or above a pre-defined threshold number of fingerprints. Other examples and implementations are also possible.

In a third example technique, which could be applied separately from or in combination with the second technique, the positioning server could identify a GNSS-denied area by searching the initial radio map for areas where associated radio fingerprint(s) include GNSS-based reference location(s) that are of low-quality. In particular, the third example technique stems from a realization that low-quality GNSS service may be unreliable, and area(s) with such low-quality GNSS service likely should also be deemed as GNSS-denied area(s). To facilitate this, crowd-sourced fingerprint(s) could include GNSS quality metric(s) (e.g., determined or provided by mobile device(s)) when they include GNSS-based reference location(s). A given quality metric indicating a low-quality, GNSS-based location may include or may otherwise be based on one or more of the following: a relatively high location error (e.g., greater than a pre-defined threshold error), relatively low location accuracy (e.g., lower than a pre-defined accuracy threshold), and/or a relatively low number of satellites associated with determination of the GNSS-based location (e.g., lower than a pre-defined number of satellites), among numerous other possibilities.

Given this, the positioning server could identify, in the initial radio map, a particular area associated with radio fingerprint(s) that respectively include low-quality, GNSS-based reference location(s), and could responsively deem the identified particular area as a GNSS-denied area. Here again, in some implementations, the positioning server could be configured to deem a particular area as being a GNSS-denied area only if the positioning server determines that the number of identified fingerprints (i.e., fingerprints having low-quality, GNSS-based reference locations and associated with the particular area) is at or above a pre-defined threshold number of fingerprints. Other examples and implementations are also possible.

In a fourth example technique, the positioning server could identify a GNSS-denied area based on evaluation of building data representing information about building(s). In particular, the positioning server may have stored thereon or otherwise have access to the building data, which could take the form of building footprint data and/or building 3D model data, among other options. And such building data can be leveraged to help identify GNSS-denied area(s).

By way of example, building footprint data could indicate at least which geographical areas are respectively occupied by buildings or other multi-level structures, and could optionally include other information (e.g., about streets that separate the buildings or the like). Given this, the positioning server could identify, within the building footprint data, area(s) that are occupied by building(s), and could responsively deem such areas to be GNSS-denied areas, because GNSS is typically unavailable or unreliable in indoor spaces such as spaces within building(s).

In another example, building 3D model data could indicate which geographical areas are respectively occupied by buildings, as well as information about building(s)' respective shapes and/or heights, among other attributes. Here again, the positioning server could similarly identify, within the building 3D model data, area(s) that are occupied by building(s) and could deem such area(s) to be GNSS-denied area(s). In some implementations, the positioning server could additionally or alternatively leverage building height and/or shape information to determine whether an outdoor area nearby or surrounding a particular building is an urban canyon that should be deemed as a GNSS-denied area, since GNSS service is typically unreliable or unavailable in such urban canyons For instance, the positioning server could do so by evaluating the height of the particular building and/or respective heights of nearby building(s) (e.g., building(s) adjacent to or otherwise within a predefined distance of the particular building). In a more specific example, if the positioning server determines that the particular building and an adjacent building both have respective heights that are above a threshold height, then the positioning server could responsively determine that the outdoor area between these two buildings is an urban canyon and could deem that outdoor area to be a GNSS-denied area. Numerous other examples are also possible.

Accordingly, regardless of which type of building data is used, the positioning server could identify a particular area that is represented by the initial radio map and meets a building-criterion according to the building data, and could deem the identified particular area as a GNS S-denied area. Generally, in line with the examples presented herein and others, the positioning server could determine that the building-criterion is met by the particular area according by determining one or more of the following: (i) that at least one building is present in the particular area, (ii) that the particular area spans at least a footprint of one or more buildings, (iii) that the particular area includes a number of buildings that is at or above a pre-defined threshold number of buildings, (iv) that a density of buildings in the particular area is at or above a pre-defined threshold density, (v) that the particular area includes at least one tall building having a height that is at or above a pre-defined threshold height, and/or (vi) that the particular area includes an outdoor area that is within a threshold distance away from the at least one tall building (e.g., an urban canyon). Numerous other examples and techniques are also possible.

At block 304, method 300 may involve generating a partial radio map representing radio data only for the one or more GNSS-denied areas identified in the initial radio map.

In an example implementation, the positioning server could generate the partial radio map at issue in a proactive and/or reactive manner. For example, the positioning server could generate the partial radio map in response to a request from a mobile device, which may be the same request that also triggers the operations of block 302 or a different request. As noted, such a request could be a positioning request or a download request, among others. In another example, the positioning server could generate the partial radio map in response to determining that one or more GNSS-denied areas have been identified, perhaps within a target area, with or without a request from a mobile device, so that the partial radio map is proactively or reactively generated and ready for transmission to a mobile device. Other examples are also possible.

Furthermore, the positioning server could generate the partial radio map in various ways. For example, the positioning server could retrieve, from a radio map database in which the initial radio map is stored, one or more portions of the initial radio map that correspond to the GNSS-denied area(s) identified in the initial radio map, in line with the operations of block 302. In a more specific example, the positioning server could retrieve radio map tiles that correspond to the GNSS-denied area(s). In practice, the set of retrieved radio map tiles could be considered to be the partial radio map, or the positioning server could process, modify, or otherwise add or remove information from the retrieved radio map tiles as part of the generation of the partial radio map, among other possibilities. Other examples are also possible.

In some implementations, the positioning server could generate the partial radio map to represent radio data for the identified GNSS-denied area(s) and optionally for other area(s) as well all, while maintaining the various benefits of the disclosed approach. The other area(s) at issue may include any area deemed valuable for inclusion other than the GNSS-denied area(s). For example, the positioning server could determine that GNSS is unreliable in a given area only during certain times of the day, but this partial GNSS reliability may be sufficient to deem this given area as valuable for inclusion, and thus the positioning server could generate the partial radio map to additionally include radio data for this given area. And as long as inclusion of areas other than GNSS-denied area(s) is relatively limited, the disclosed approach could permit for inclusion of radio data for such other area while maintaining a relatively low data size for the generated partial radio map to be transmitted to mobile device(s). Other examples are also possible.

At block 306, method 300 may involve transmitting the partial radio map to a mobile device for storage at the mobile device.

In an example implementation, the positioning server could transmit the partial radio map to the mobile device and could do so in various ways. As an initial matter, the positioning server could transmit the partial radio map to the mobile device via any communication mechanism currently known or developed in the future, such as over Bluetooth, WiFi, or a cellular communication network etc. Additionally, the transmission at issue could involve transmitting radio map tiles to the mobile device, so that the mobile device could then store the radio map tiles for purpose of offline position estimates at least in the GNSS-denied areas that were identified. And because the data size of the partial radio map may end up being relatively small, the disclosed approach may help eliminate or reduce excessive consumption of communication bandwidth and/or optimize resource usage at the mobile device e.g., by limiting the amount of storage the partial radio map takes up at the mobile device. Other examples and advantages are also possible.

Figure 4:
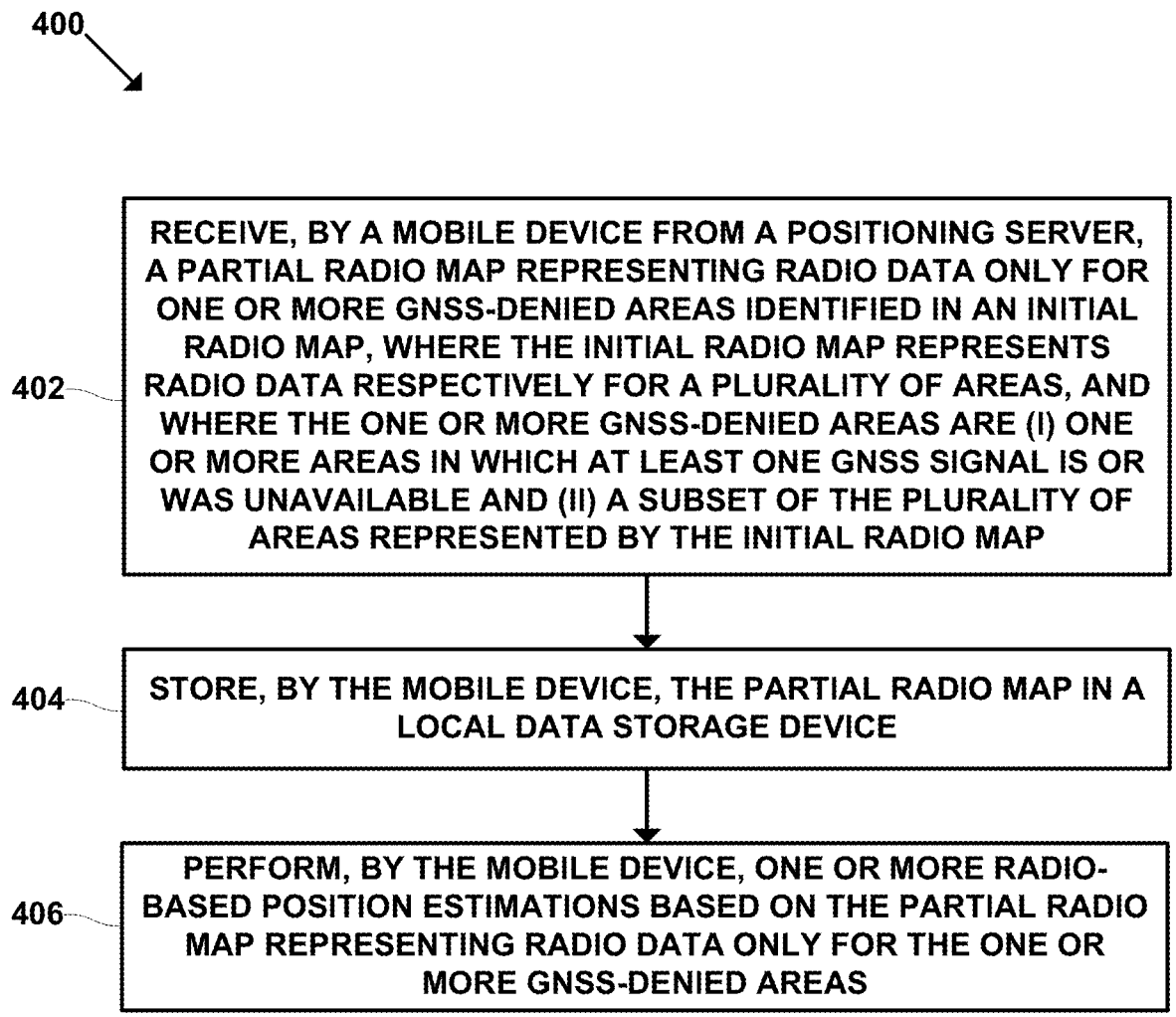
FIG. 4 is an example flowchart related to obtaining the partial radio map associated with GNSS-denied areas, in accordance with an example implementation.

FIG. 4 is next a flowchart illustrating method 400, in accordance with the present disclosure. Method 400 could be performed by and/or in an arrangement involving a mobile device (and/or any other device or system) or more particularly by component(s)/module(s) (e.g., processor(s)) thereof, among other possibilities. Moreover, it should be understood that any features or aspects of the present disclosure as described in the context of method 300 could also be applied or otherwise performed in the context of method 400 set forth below from the perspective of the mobile device that can communicate with the positioning server as described.

Accordingly, at block 402, method 400 may involve receiving, by a mobile device from a positioning server, a partial radio map representing radio data only for one or more GNSS-denied areas identified in an initial radio map, where the initial radio map represents radio data respectively for a plurality of areas, and where the GNSS-denied area(s) are (i) one or more areas in which at least one GNSS signal is or was unavailable and (ii) a subset of the plurality of areas represented by the initial radio map. And at block 404, method 400 may next involve storing, by the mobile device, the partial radio map in a local data storage device. Finally, at block 406, method 400 may involve performing, by the mobile device, radio-based position estimation(s) based on the partial radio map representing radio data only for the GNSS-denied area(s).

Although certain methods have been described, it should be understood that other processes and/or modification of one or more of the described processes may also be possible in the context of the present disclosure.

III. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
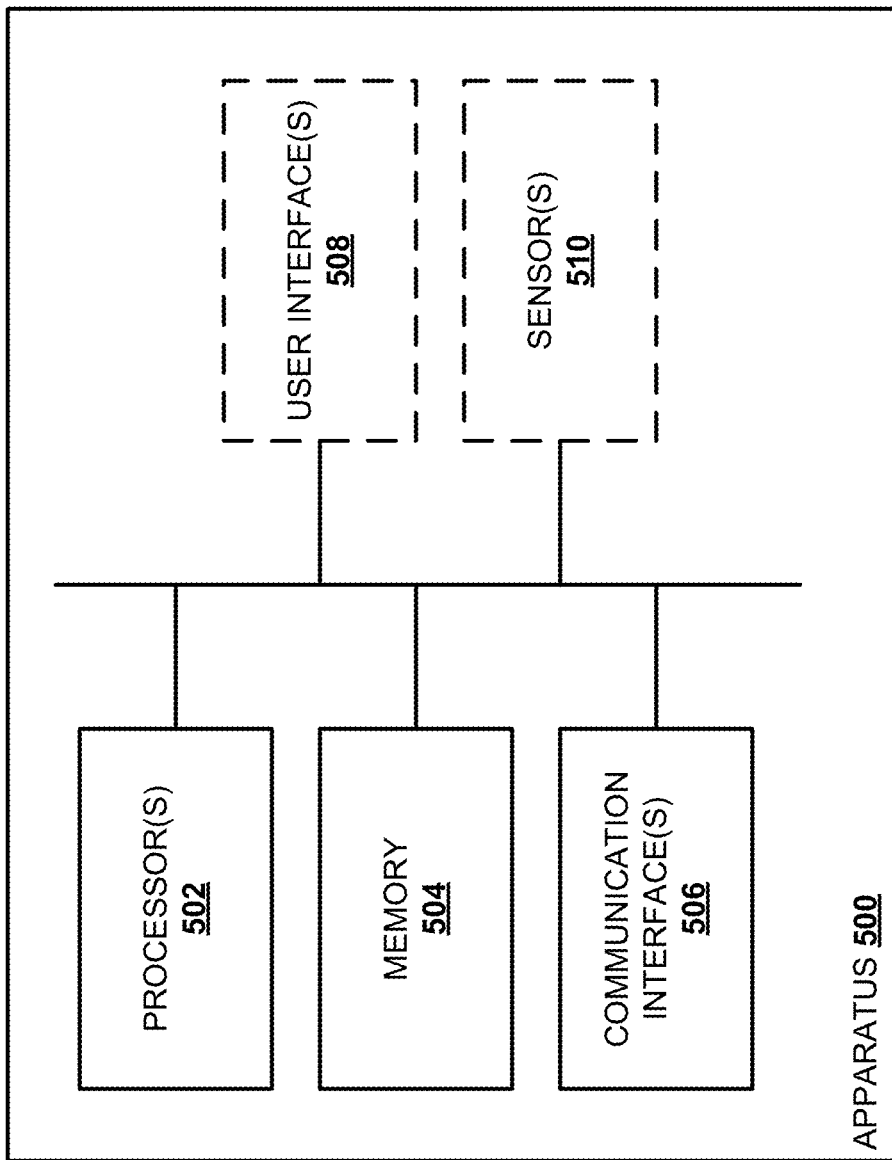
FIG. 5 illustrates an example apparatus, in accordance with an example implementation.

FIG. 5 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. Example Geographic Database

Figure 6:
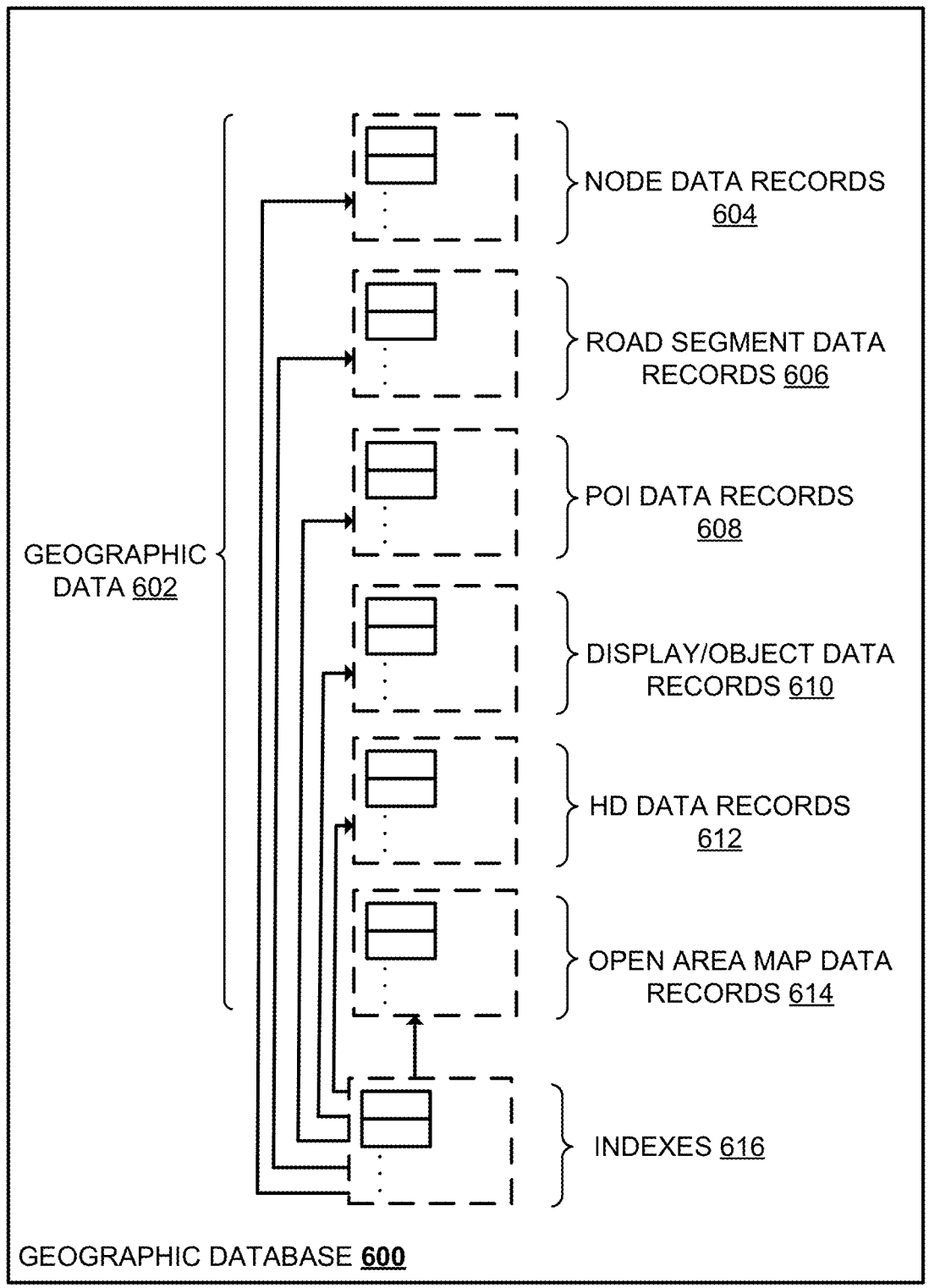
FIG. 6 illustrates a diagram of a geographic database, in accordance with an example implementation.

FIG. 6 illustrates a diagram of a geographic database 600, according to an example implementation. Geographic database 600 could be included within, integrated with, or be separate from another database, data storage device, memory, or the like described herein (e.g., memory 504). Additionally or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, or paths, as can be used in a calculated or recorded route information for determination of one or more personalized routes. The node data records 604 may be end points corresponding to the respective links or segments of the road segment data records 606. The road link data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   receiving Global Navigation Satellite System (GNSS) data for a plurality of areas;
   generating an initial radio map, wherein the initial radio map represents radio data respectively for a plurality of areas;
   identifying, by one or more processors, one or more Global Navigation Satellite System (GNSS)-denied areas in the initial radio map, wherein the one or more GNSS-denied areas are (i) one or more areas in which at least one GNSS signal is or was unavailable and (ii) a subset of the plurality of areas represented by the initial radio map;
   generating, by the one or more processors, a partial radio map representing radio data only for the one or more GNSS-denied areas identified in the initial radio map; and
   transmitting, by the one or more processors, the partial radio map to a mobile device for storage at the mobile device.

2. The method of claim 1, wherein the identifying comprises:
   identifying, in the initial radio map, a multi-layer area that represents radio data in two or more vertical layers; and
   deeming the identified multi-layer area as one of the one or more GNSS-denied areas to be represented by the partial radio map.

3. The method of claim 1, wherein the initial radio map is generated based on crowdsourced radio fingerprints that each respectively include at least one radio measurement and a corresponding reference location, and wherein the identifying comprises:
   identifying, in the initial radio map, a particular area associated with one or more radio fingerprints that respectively include non-GNSS reference locations, rather than GNSS-based reference locations; and
   deeming the identified particular area as one of the one or more GNSS-denied areas to be represented by the partial radio map.

4. The method of claim 1, wherein the initial radio map is generated based on crowdsourced radio fingerprints that each respectively include at least one radio measurement and a corresponding reference location, and wherein the identifying comprises:
   identifying, in the initial radio map, a particular area associated with one or more radio fingerprints that respectively include low-quality, GNSS-based reference locations; and
   deeming the identified particular area as one of the one or more GNSS-denied areas to be represented by the partial radio map.

5. The method of claim 1, wherein the one or more processors have access to building data representing information about one or more buildings in one or more areas, and wherein the identifying comprises:
   identifying a particular area that is represented by the initial radio map and meets a building-criterion according to the building data; and
   deeming the identified particular area as one of the one or more GNSS-denied areas to be represented by the partial radio map.

6. The method of claim 5, wherein the building-criterion being met by the particular area corresponds to one or more of:
   (i) at least one building being present in the particular area,
   (ii) the particular area spanning at least a footprint of one or more buildings,
   (iii) the particular area including at least a threshold number of buildings,
   (iv) a density of buildings in the particular area exceeding a threshold density,
   (v) the particular area including at least one tall building having a height that exceeds a threshold height, or
   (vi) the particular area including an outdoor area that is within a threshold distance away from the at least one tall building.

7. The method of claim 1, wherein the identifying further comprises identifying the one or more GNSS-denied areas based on the one or more GNSS-denied areas being within a pre-defined threshold distance away from the mobile device.

8. The method of claim 1,
   wherein the initial radio map is stored in a database that is accessible to the one or more processors, and
   wherein generating the partial radio map comprises retrieving, from the database, one or more portions of the initial radio map that correspond to the one or more GNSS-denied areas identified in the initial radio map.

9. The method of claim 1, wherein transmitting the partial radio map to the mobile device enables the mobile device to optimize resource usage and perform radio-based position estimations at least in the one or more GNSS-denied areas that were identified.

10. An apparatus comprising:
   one or more processors;
   a non-transitory computer readable medium; and
   program instructions stored on the non-transitory computer readable medium and executable by the one or more processors to:
   receive Global Navigation Satellite System (GNSS) data for a plurality of areas;
   generate an initial radio map, wherein the initial radio map represents radio data respectively for a plurality of areas;
   identifying, by one or more processors, one or more Global Navigation Satellite System (GNSS)-denied areas in the initial radio map, wherein the one or more GNSS-denied areas are (i) one or more areas in which at least one GNSS signal is or was unavailable and (ii) a subset of the plurality of areas represented by the initial radio map;
   generate a partial radio map representing radio data only for the one or more GNSS-denied areas identified in the initial radio map; and
   transmit the partial radio map to a mobile device for storage at the mobile device.

11. The apparatus of claim 10, wherein the identifying comprises:
   identifying, in the initial radio map, a multi-layer area that represents radio data in two or more vertical layers; and
   deeming the identified multi-layer area as one of the one or more GNSS-denied areas to be represented by the partial radio map.

12. The apparatus of claim 10, wherein the initial radio map is generated based on crowdsourced radio fingerprints that each respectively include at least one radio measurement and a corresponding reference location, and wherein the identifying comprises:
   identifying, in the initial radio map, a particular area associated with one or more radio fingerprints that respectively include non-GNSS reference locations, rather than GNSS-based reference locations; and
   deeming the identified particular area as one of the one or more GNSS-denied areas to be represented by the partial radio map.

13. The apparatus of claim 10, wherein the initial radio map is generated based on crowdsourced radio fingerprints that each respectively include at least one radio measurement and a corresponding reference location, and wherein the identifying comprises:
   identifying, in the initial radio map, a particular area associated with one or more radio fingerprints that respectively include low-quality, GNSS-based reference locations; and
   deeming the identified particular area as one of the one or more GNSS-denied areas to be represented by the partial radio map.

14. The apparatus of claim 10, wherein the one or more processors have access to building data representing information about one or more buildings in one or more areas, and wherein the identifying comprises:
   identifying a particular area that is represented by the initial radio map and meets a building-criterion according to the building data; and
   deeming the identified particular area as one of the one or more GNSS-denied areas to be represented by the partial radio map.

15. The apparatus of claim 14, wherein the building-criterion being met by the particular area corresponds to one or more of:
   (i) at least one building being present in the particular area,
   (ii) the particular area spanning at least a footprint of one or more buildings,
   (iii) the particular area including at least a threshold number of buildings,
   (iv) a density of buildings in the particular area exceeding a threshold density,
   (v) the particular area including at least one tall building having a height that exceeds a threshold height, or (vi) the particular area including an outdoor area that is within a threshold distance away from the at least one tall building.

16. The apparatus of claim 10, wherein the identifying further comprises identifying the one or more GNSS-denied areas based on the one or more GNSS-denied areas being within a pre-defined threshold distance away from the mobile device.

17. The apparatus of claim 10,
wherein the initial radio map is stored in a database that is accessible to the one or more processors, and
wherein generating the partial radio map comprises retrieving, from the database, one or more portions of the initial radio map that correspond to the one or more GNSS-denied areas identified in the initial radio map.

18. The apparatus of claim 10, wherein transmitting the partial radio map to the mobile device enables the mobile device to optimize resource usage and perform radio-based position estimations at least in the one or more GNSS-denied areas that were identified.

* * * * *